Patented June 1, 1937

2,081,949

UNITED STATES PATENT OFFICE 2,081,949

METHOD OF PRINTING

Walter W. Mock, Rutherford, N. J., assignor to The International Printing Ink Corporation, New York, N. Y., a corporation of Ohio No Drawing. Application December 18, 1931, Serial No. 581,988

8 Claims. (Cl. 91—67.9)

This invention relates to a method of printing, and provides for maintaining a printing ink fluid on the press and causing a very rapid setting of the printing ink on the printed sheet. The invention includes also a new article produced by the method.

In order that an ink may be set on a printed sheet so as to avoid smudging or offsetting, it is necessary that the pigment of the ink be bound to the sheet by a solid material. Such setting is ordinarily caused by the elimination of the liquid portion of the ink either by conversion of the liquid portion of the ink into a solid by oxidation or else by penetration into the paper or by evaporation. It is, however, unnecessary to eliminate or convert the liquid portion of a printing ink in order to set it by binding the pigment to the paper. In the case of inks containing water or an aqueous solvent and a water-soluble colloid dissolved therein, setting has been caused by changing the physical nature of the colloid either chemically or by means of heat so as to render it insoluble and thus precipitating it and the pigment on the sheet. This method of setting ink, by insolubilizing a normally water-soluble colloid, is slow, as the colloid, whether treated chemically or by heat, does not become hard and solid quickly.

I have discovered that it is possible to set a printing ink which will not dry on the press and which contains a pigment dispersed in a solution of a hard solid binding material in a non-volatile, non-aqueous liquid solvent, without oxidation or evaporation and without changing the chemical nature of the binder, and I have provided a method by which such an ink may be set on the printed sheet with great rapidity. In accordance with my invention, such an ink is printed on a sheet or other article in the ordinary manner, and the ink on the sheet or article is then immediately treated with a liquid which is perfectly miscible with the non-volatile solvent, that is, compatible with the non-volatile solvent, but which is not, in itself, a solvent for the binder. The solvent and non-solvent form an intimate mixture from which the binder is instantly precipitated or coagulated as a hard adhesive non-smearing film which binds the pigment to the sheet. The intimate mixture of the solvent and non-solvent may be described as an absorption of the solvent by the non-solvent or, more technically, as dilution of the solvent with the non-solvent.

In carrying out the method, the non-solvent diluent for the solvent may be a liquid which will remain on the printed sheet and impart some desirable characteristic thereto.

One of the purposes for which my invention has proved particularly desirable is the making of marked waxed articles, and I shall, by way of example, describe in detail the application of my method to this use.

The pigments employed in preparing the ink for my method of marking waxed paper are the same as those used in waxed paper inks of present day manufacture, that is, pigments which do not dissolve or bleed into the molten wax. The vehicle used comprises a binder such as a nitrated and/or an acetylated cellulose and a suitable solvent for the binder. In making up such an ink, it is preferred to put the nitrated or acetylated cotton in solution before the pigment is added. An example of a suitable procedure is as follows:

About 140 parts by weight of half second R. S. nitrocellulose (soluble in acetone and acetates), ordinarily containing about 30% by weight of alcohol, is mixed with 200 parts of dimethyl phthalate. During the operation most of the alcohol in the original nitrocellulose is lost by evaporation and the above mixture yields approximately 310 parts of the lacquer. In making up the final ink with a black pigment, about 50 parts of the above vehicle or lacquer is thoroughly mixed with about 14 parts of carbon black and 28 parts of dimethyl phthalate, giving a thick, pasty printing ink having the following analysis:

| | Parts by weight |
|---|---|
| Carbon black | 14 |
| ½ second nitrocellulose (dry weight) | 16 |
| Dimethyl phthalate | 62 |

In a similar manner a blue hot-wax ink may be made by mixing the above vehicle or lacquer with additional dimethyl phthalate and iron blue pigment to give an ink of the following composition by weight:

| | Parts |
|---|---|
| Iron blue | 25 |
| ½ second R. S. nitrocellulose | 15 |
| Dimethyl phthalate | 70 |

The solvent dimethyl phthalate has a boiling point of about 300° C. At 20° C. its vapor pressure is considerably less than 0.05 millimeters.

The ink described above is applied to the paper, cardboard, glassine, transparent cellulose sheeting, diaphane, or moisture proof transparent cellulose sheetings, etc., by means of a printing press or other suitable means and the printed material may be immediately dipped into a molten bath of paraffine or other wax (heated, for example, to between about 100° to 150° C.).

The ink applied as above described dries almost immediately when its printed film is immersed in the molten wax and the printed film also does not have an objectionable odor. This immediate setting results from the fact that the high boiling solvent for the nitrocellulose (for example, the dimethyl phthalate) is perfectly miscible with the molten wax, while all types of cellulose (R. S. and A. S.) are insoluble in molten wax. Therefore, when a printed film of inks made with a vehicle consisting of nitrated or acetylated cellulose and a solvent of the type mentioned above is passed into a molten wax, the solvent is so diluted by the wax that the cellulose ester is immediately precipitated, thereby binding itself and its occluded pigment fast to the paper, or other material to which it is applied. The quantity of wax is so large in comparison to the quantity of ink that a sufficient quantity of the solvent is absorbed in the wax to harden the film without materially affecting the melting point of the wax. The improved ink is particularly advantageous in marking material such as metal, moisture proof transparent cellulose sheeting, glassine, etc., where penetration of the ink into the material is prevented because of the nature of the material.

The ink does not dry on the press even when the latter is allowed to stand idle and does not body or liver on prolonged storage nor is a skin formed on its surface when it is stored in the can. This is because, at the temperature at which the ink is spread out on the press and printed (about 20° C.), the vapor pressure of the solvent in the ink is so low that substantially no evaporation takes place.

The examples given above are illustrative and it is not intended to limit the invention to the particular embodiment given. The percentage of pigment in the ink will of course vary with the pigment used and with the hiding power and intensity of color desired. The pigment content may vary for example from 10 to 60% of the weight of the ink. Also the percentage of solvent to cellulose ester in the vehicle may be varied depending upon the type and viscosity of the cellulose ester used, the viscosity desired in the product in the use to be made of it, and the degree of hardness sought in the final film. For printing inks of the type described it is preferred to use a vehicle containing 3 to 5 times as much solvent as cellulose ester.

It is not intended to limit the improvement to the particular proportions described above nor to the particular ingredients. Nitrated cellulose of quarter second, 10 second, 35 second, 40 second and 150 second viscosity (measured by the "Falling Ball" or Hercules Power Company methods) may be used in place of the half second viscosity variety specifically mentioned. The higher the viscosity of the nitrocellulose used, the smaller the amount of nitrocellulose and pigment which can be incorporated in the solvent to make the ink of the required viscosity and when it is desirable to use as much pigment as possible, the half second or quarter second nitrocellulose is preferred. Also, A. S. nitrocellulose (alcohol soluble nitrocellulose) or acetylated cellulose of corresponding viscosities may be used in place of the nitrocellulose given in the example.

The solvent need not be limited to dimethyl phthalate, since diethyl phthalate, dibutyl phthalate, diamyl phthalate, dimethyl tartrate, diethyl tartrate, dibutyl tartrate, triacetin, benzyl alcohol, ethyl benzoate, tricresyl phosphate and a great many other high boiling nitrocellulose solvents may be used. In selecting a high boiling solvent, those having boiling points not less than 200° C. at 760 mm. pressure, and particularly those having a boiling point above 300° C., are preferred. A feature of particular importance in selecting the solvent to be used in the vehicle is the vapor pressure of the solvent, since it is desired to inhibit evaporation of the solvent in order that the composition of the vehicle or ink will remain constant upon standing. It is desirable, therefore, to use a solvent having a vapor pressure of less than .20 millimeter at 20° C. and preferably considerably less than .05 millimeter at 20° C.

Particular reference has been made in the description of the invention to its use for making waxed paper, etc., but it is not intended to thereby limit it to the particular embodiment described. The method described may be used in many different compositions and for use upon many different articles. It is apparent that one skilled in the art may utilize it in other solutions to be used with wax coated articles or where it is desired to apply a coating to the article to be marked by precipitation of a portion of the vehicle.

The terms used in describing this invention have been used in their descriptive sense and not as terms of limitation and it is intended that all equivalents of these terms be included within the scope of the appended claims. In using the term "non-volatile" in the claims it is intended to refer to a material having a vapor pressure of less than 1 millimeter at 20° C. The term "half second, quarter second, etc. nitrocellulose" is based upon the Falling Ball or Hercules Powder Company method of determining the number of seconds required for a $\frac{1}{4}$ inch steel ball weighing 2.0385 grams to fall 10 inches through a solution containing 12.2% by weight of dry nitrated ester in 22.0% #1 denatured alcohol, 17.5% ethyl acetate and 48.3% toluol. In making the test the solution is placed in a glass tube having an internal diameter of .984 inch and being 14 inches long, and the measurement is made between marks on this tube 10 inches apart and positioned 2 inches from each end.

What I claim is:

1. The method which consists in printing on an article with a printing ink which does not dry on the press and which contains a pigment dispersed in a solution of nitrocellulose dissolved in dimethyl phthalate, and immediately after printing diluting the dimethyl phthalate in the printed film of said ink with melted paraffine wax to precipitate or coagulate said nitrocellulose to produce a hard adhesive non-smearing film occluding the pigment.

2. The method which consists in printing on an article with a printing ink which does not dry on the press and which contains coloring matter dispersed in a solution of a tenacious solid binder dissolved in a non-aqueous non-volatile liquid solvent, and immediately after printing diluting the said solvent in the printed film of said ink with a liquid which is compatible with said solvent and is a non-solvent for said binder and the coloring matter to precipitate or coagulate said binder to produce a hard adhesive non-smearing film occluding the coloring matter.

3. The method which consists in dissolving nitrocellulose in dimethyl phthalate and mixing a pigment in said solution to provide a printing ink which does not dry on the press, printing a film of said pigmented solution upon an article, and then diluting the dimethyl phthalate in the film on the article with melted paraffine wax to precipitate or coagulate the nitrocellulose to produce a hard adhesive non-smearing film occluding the pigment.

4. The method which consists in dissolving a tenacious solid binder in a non-volatile non-aqueous liquid solvent and mixing a pigment in said solution to provide a printing ink which does not dry on the press, printing a film of said pigmented solution upon an article, and then diluting the said solvent in the film on the article with a liquid which is compatible with said solvent and is a non-solvent for the binder to precipitate or coagulate the binder to produce a hard adhesive non-smearing film occluding the pigment.

5. An article consisting of a base material having markings thereon comprising a hard adhesive non-smearing film of nitrocellulose binding occluded pigment to the base material, and a solidified coating covering said markings and consisting of a mixture of paraffine wax and dimethyl phthalate in such proportions that the mixture is a non-solvent for nitrocellulose.

6. An article consisting of a base material having markings thereon comprising a hard adhesive, non-smearing film of a tenacious, solid binder binding occluded pigment to the base material, and a solidified coating covering said markings and consisting of a mixture of paraffine wax and a non-volatile, non-aqueous, liquid solvent for the binder which is perfectly miscible with paraffine wax in such proportions that the mixture is a non-solvent for the binder.

7. The method which consists in printing on an article with a printing ink which does not dry on the press and which contains coloring matter dispersed in a solution of a tenacious solid binder insoluble in paraffine wax dissolved in a non-aqueous non-volatile liquid solvent compatible with paraffine wax, and thereafter while the ink in the printed film is still wet immersing the article in melted paraffine wax to precipitate or coagulate said binder to produce a hard adhesive non-smearing film occluding the coloring matter.

8. The method which consists in printing on an article with a printing ink which does not dry on the press and which contains coloring matter dispersed in a solution of a tenacious, solid binder dissolved in a non-aqueous, non-volatile liquid solvent, and then diluting the solvent in the film on the article with melted wax which is compatible with said solvent and is a non-solvent for said binder and the coloring matter, to precipitate or coagulate said binder to produce a hard adhesive non-smearing film occluding the coloring matter.

WALTER W. MOCK.